April 7, 1959 D. J. OLDENBOOM 2,880,999

RECORD CARD IN-FLIGHT ALIGNER AND ADVANCING MECHANISM

Filed May 11, 1956 4 Sheets-Sheet 1

INVENTOR.
DERK J. OLDENBOOM

BY J. Jancin Jr.

ATTORNEY

RECORD CARD IN-FLIGHT ALIGNER AND ADVANCING MECHANISM

Filed May 11, 1956 4 Sheets-Sheet 2

April 7, 1959 D. J. OLDENBOOM 2,880,999

RECORD CARD IN-FLIGHT ALIGNER AND ADVANCING MECHANISM

Filed May 11, 1956 4 Sheets-Sheet 3

April 7, 1959 D. J. OLDENBOOM 2,880,999

RECORD CARD IN-FLIGHT ALIGNER AND ADVANCING MECHANISM

Filed May 11, 1956 4 Sheets-Sheet 4

United States Patent Office 2,880,999

Patented Apr. 7, 1959

2,880,999

RECORD CARD IN-FLIGHT ALIGNER AND ADVANCING MECHANISM

Derk J. Oldenboom, Johnson City, N.Y., assignor to International Business Machines Corporation, New York, N.Y., a corporation of New York Application May 11, 1956, Serial No. 584,300

5 Claims. (Cl. 271—52)

This invention relates to a record card aligning device for registering moving record cards.

A principal object of this invention is to provide an in-flight record card aligning device for acting upon individual cards that are in motion so as to register the cards and correct for card misalignment.

Another object of this invention is to provide an improved record card aligning device that is compact in design and efficient in operation, one which is unlikely to get out of order, and yet a device that may be manufactured at relatively low cost.

A specific object of this invention is to provide an in-flight record card aligning device for use in a xerographic printer of the class described wherein it is necessary to register or accurately align each moving record card with a respective correspondingly moving transferable powder image which is supported by the xerographic drum of said printer.

Other objects of the invention will be pointed out in the following description and claims and illustrated in the accompanying drawings, which disclose, by way of examples, the principle of the invention and the best mode, which has been contemplated, of applying that principle.

Figure 6:
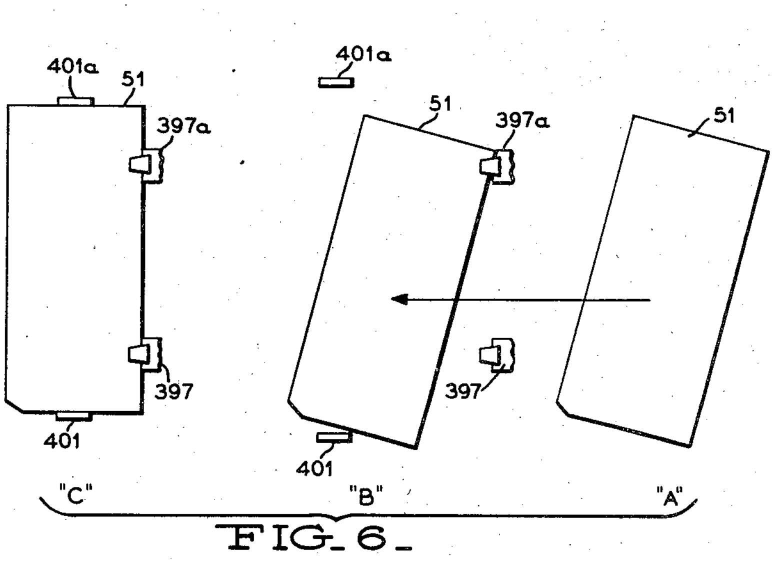

Fig. 6 schematically depicts the action of the card in-flight aligning mechanism.

*Xerographic printer*

Figure 1:
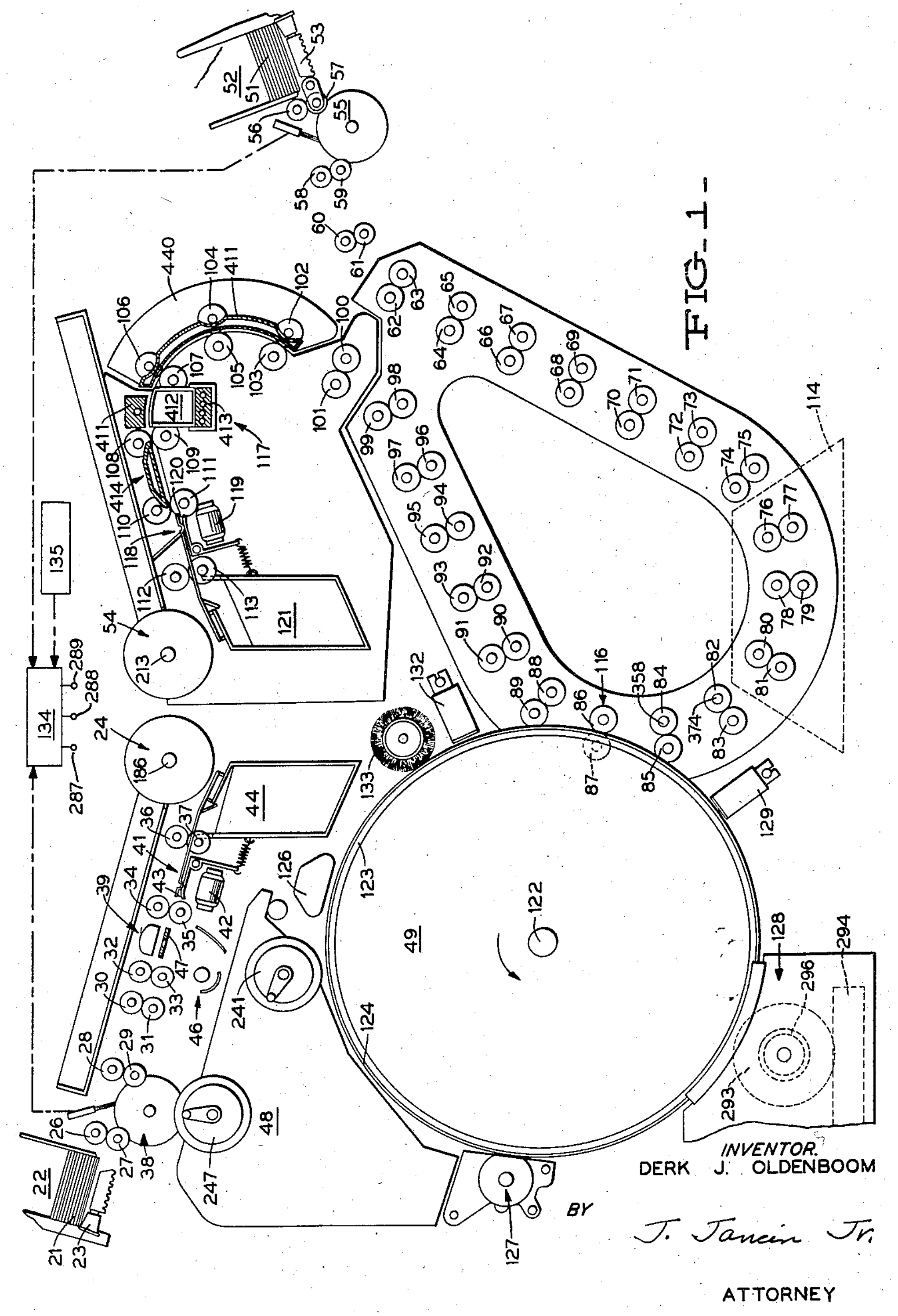
Fig. 1 is a diagrammatic view of a record card controlled printer.

A machine in which the preferred embodiment of the present invention can be used, is shown in Fig. 1. A detailed description of this machine, i. e., the so-called card-to-card xerographic printer, is available in a copending U.S. patent application to M. J. Kelly, Serial No. 556,176, filed December 29, 1955. Briefly described, primary source information record cards 21 to be operated on are stacked in a hopper 22 and are fed out of the hopper, one-by-one, each primary card feed cycle by a conventional card picker mechanism 23. Successive pairs of feed rollers 26—37 cause a primary card to be advanced during successive card feed cycles past a punched hole indicia brush reading station 38, a source information optical scanning station 39, and into a record card stacker 24 or 44. There is associated with the optical scanning station 39 a light ray projector apparatus 46 for effecting a conventional light scanning operation of a primary record card, whereby the image of optically visible source information carried by the primary card, is transferred by the optical projecting apparatus 48 to the previously charged surface of xerographic drum 49. This drum includes an electrically conductive cylinder 123 onto which a light sensitive photoconductive insulating layer 124, such as amorphous selenium for example, is secured. It should be clear that xerographic drum 49 must be driven in a counterclockwise direction at a speed which is correlated to the lineal speed of feeding primary cards through the optical scanning station 39.

As successive incremental areas of the photoconductive insulating layer 124 are moved past the ion-producing charging unit 126, the said layer is electrically charged positive. Thus, a latent electrostatic image is formed on said layer 124 upon exposure to the optical image of primary card source information, which latent electrostatic image has the same design or configuration as that of the source information. Continued rotation of the xerographic drum in a counterclockwise direction causes the incremental surface areas of insulating layer 124 to be moved past a latent image masking-erasing unit 127 and a rotating developing brush 293 which is employed to apply a pigmented powder, e. g., electroscopic toner, onto the surface of the insulating layer, to thereby develop the latent electrostatic images. It should be mentioned here that in addition to the afore-mentioned co-pending Kelly patent application, reference may be had to another co-pending U.S. patent application to W. D. Bolton et al., Serial No. 554,515, filed December 21, 1955, for a more detailed description of brush developing apparatus used to apply toner to the surface of a xerographic drum. The masking-erasing unit 127 which is not a part of the present invention, is fully disclosed in a co-pending U.S. patent application to I. M. Hix, Serial No. 556,216, filed December 29, 1955.

Figure 5:
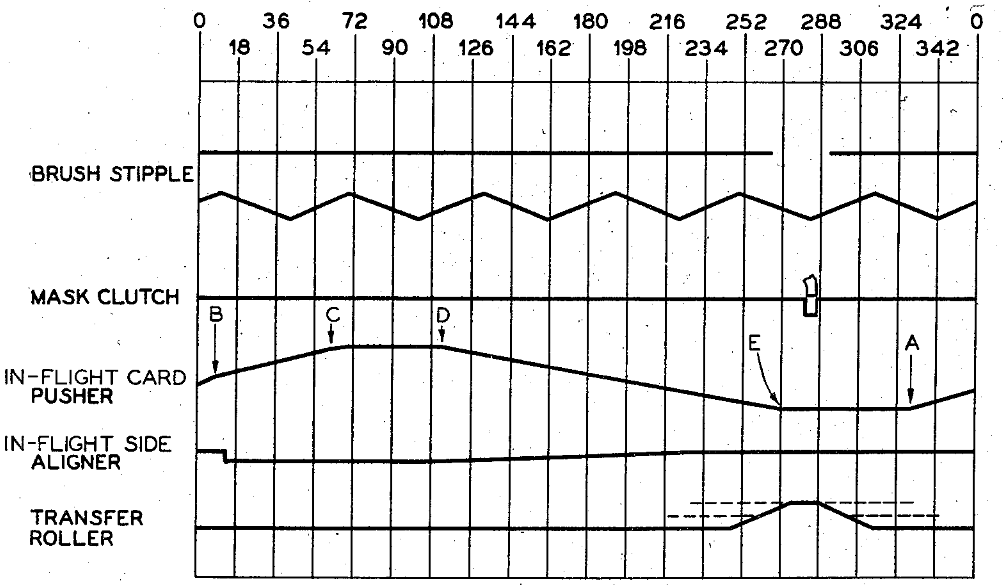
Fig. 5 is a mechanical timing chart.

Further rotation of drum 49 causes each developed toner image appearing on the surface of insulating layer 124 to be moved out of the developing station 128, past a negative ion-producing unit 129 similar to previously mentioned corona unit 126, and into a transfer, i.e., a printing, station 116 having a conductive image transfer roller (not shown) therein. This image transfer apparatus including the roller is substantially similar to the arrangement shown and described in co-pending U.S. patent application, Serial No. 419,314, to C. J. Fitch, filed March 29, 1954, now Patent No. 2,807,233. The operation of the apparatus at transfer station 116 is such as to effect a transfer of a developed toner image from the surface of xerographic drum 49 to a related secondary record card 51. The timed operation of the developer brush 293, the masking-erasing unit clutch (not shown), and the transfer roller (also not shown), is depicted by the timing chart of Fig. 5.

The secondary record cards 51 to be operated upon are stacked in a secondary hopper 52 and are fed therefrom, one-by-one, each secondary card feed cycle by a conventional card picker mechanism 53 via a somewhat circuitous route defined by feed rollers 56—113 toward a secondary card stacker 54 or 121. These secondary cards are caused to be advanced during each succeeding secondary card feed cycle past a punched hole indicia brush reading station 55, an in-flight record card aligner mechanism which is identified by reference numeral 114, the afore-mentioned image transfer station 116, and a secondary card toner image heat fixing station 117.

Needless to say, the speed of feeding secondary cards from their hopper 52 to a stacker must be correlated to the peripheral speed of xerographic drum 49. This, of course, is necessary in order that any single developed image on the surface of drum 49, may be associated with a secondary card which is related to the primary card having source information thereon that is similar to the developed image. In view of the fact that the distance from secondary card hopper 52 to image transfer station 116 is long as represented by approximately sixteen sets of feed rollers 56—87, and since the secondary cards are each being continuously advanced at a lineal speed of approximately 700 inches per minute, the possibility always exists of secondary cards becoming misaligned prior to their being moved past transfer station 116. It is by way of the present invention, the preferred embodiment of which is identified by reference numeral 114 in Fig. 1, that all secondary cards including those out of alignment are brought into register while being maintained in flight. Thus, immediately prior to the time that an advancing secondary card is to be moved into and through the transfer station 116 wherein a developed toner image on the surface of drum 49 is transferred onto the said secondary card, this moving card is aligned and brought into registration. The secondary card is registered while in flight so as not to detract from the overall speed and efficiency of the xerographic printer. In other words, the operation of the subject record card aligner mechanism is such as to avoid any lost time insofar as the feeding of secondary cards is concerned, while each card is being moved through the card aligner station.

*In-flight card aligner unit*

Figure 3:
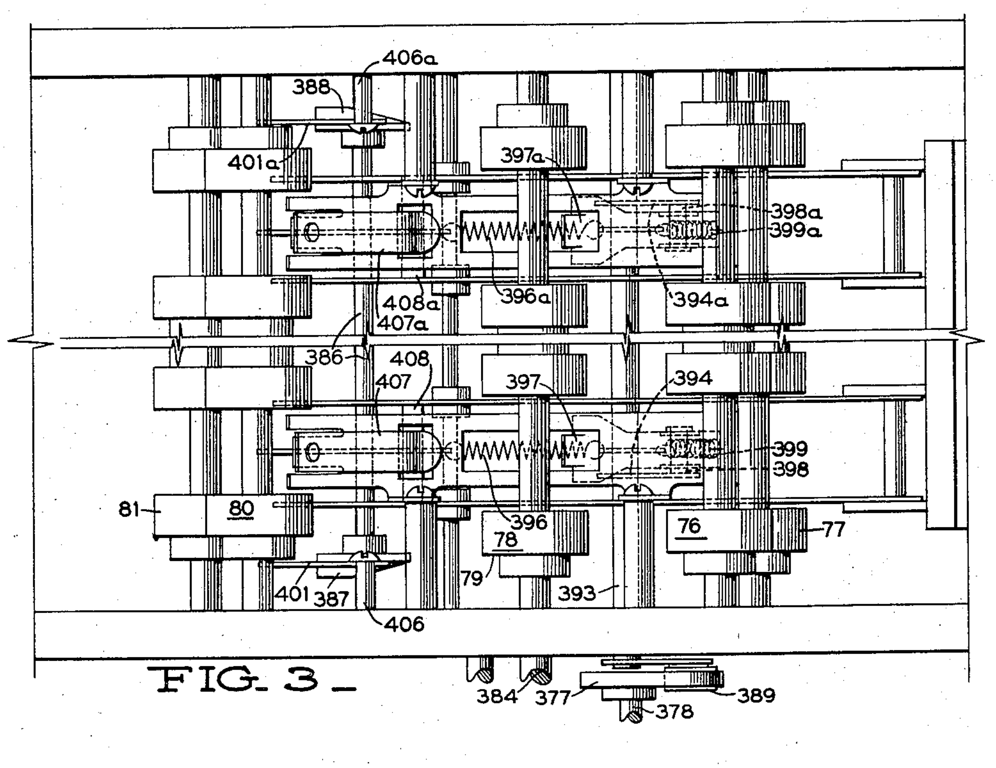
Fig. 3 is a plan view of this card aligning mechanism.
Figure 4:
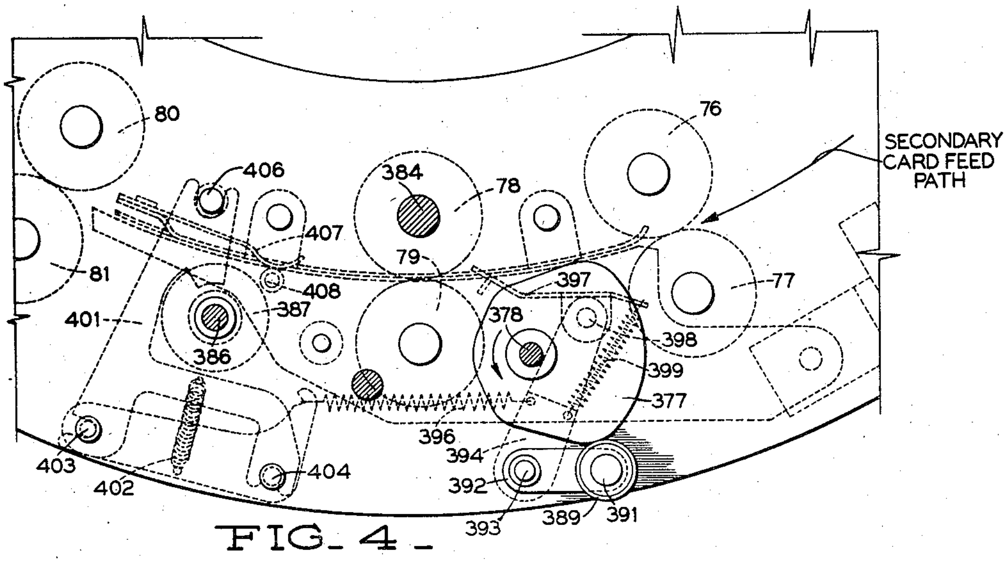
Fig. 4 is an elevation of the card aligning mechanism.

Referring to Fig. 4, the side elevation of the secondary card feed mechanism shown is, in general, the portion identified in Fig. 1 as being within block 114. Accordingly, each secondary card is caused to be moved by the mechanism of Fig. 4 in a leftward direction. The position of all cooperating pairs of feed rollers in the secondary feed unit with respect to each other, except for feed rollers 80—81, is such that the leading edge of an advancing secondary card is moved into the bite of a set of feed rollers, e.g., feed rollers 78—79, prior to the time that the trailing edge of this moving secondary card is fed out of the bite of succeeding feed rollers 76—77. This, however, is not the case insofar as feed rollers 78—81 are concerned. That is, the distance between the bite provided by the feed rollers 78—79 and the bite of the feed rollers 80—81, is greater than the width of a single secondary card. Hence, it must be clear that some other card advancing means is necessary to move each succeeding secondary card into the bite of feed rollers 80—81. This advancing means is provided in the form of card pushers 397 and **397*a*** (see also Fig. 3), with their related apparatus to be described hereinafter.

As stated previously, an examination of Fig. 1 will show that the primary record card feed unit is quite short as compared with the secondary card feed unit which, in fact, defines a long, winding card path. This, of course, means that there is always a possibility that the secondary card 51 will be moved slightly out of registration or alignment with respect to the developed xerographic images that appear on the surface of xerographic drum 49. Needless to say, this would be very undesirable particularly should misalignment occur prior to the time the secondary cards are each passed through transfer station 116. To make certain that all of the secondary cards are in proper alignment as each passes through the transfer station 116, the in-flight card aligner represented by reference numeral 114 is provided.

Figure 2:
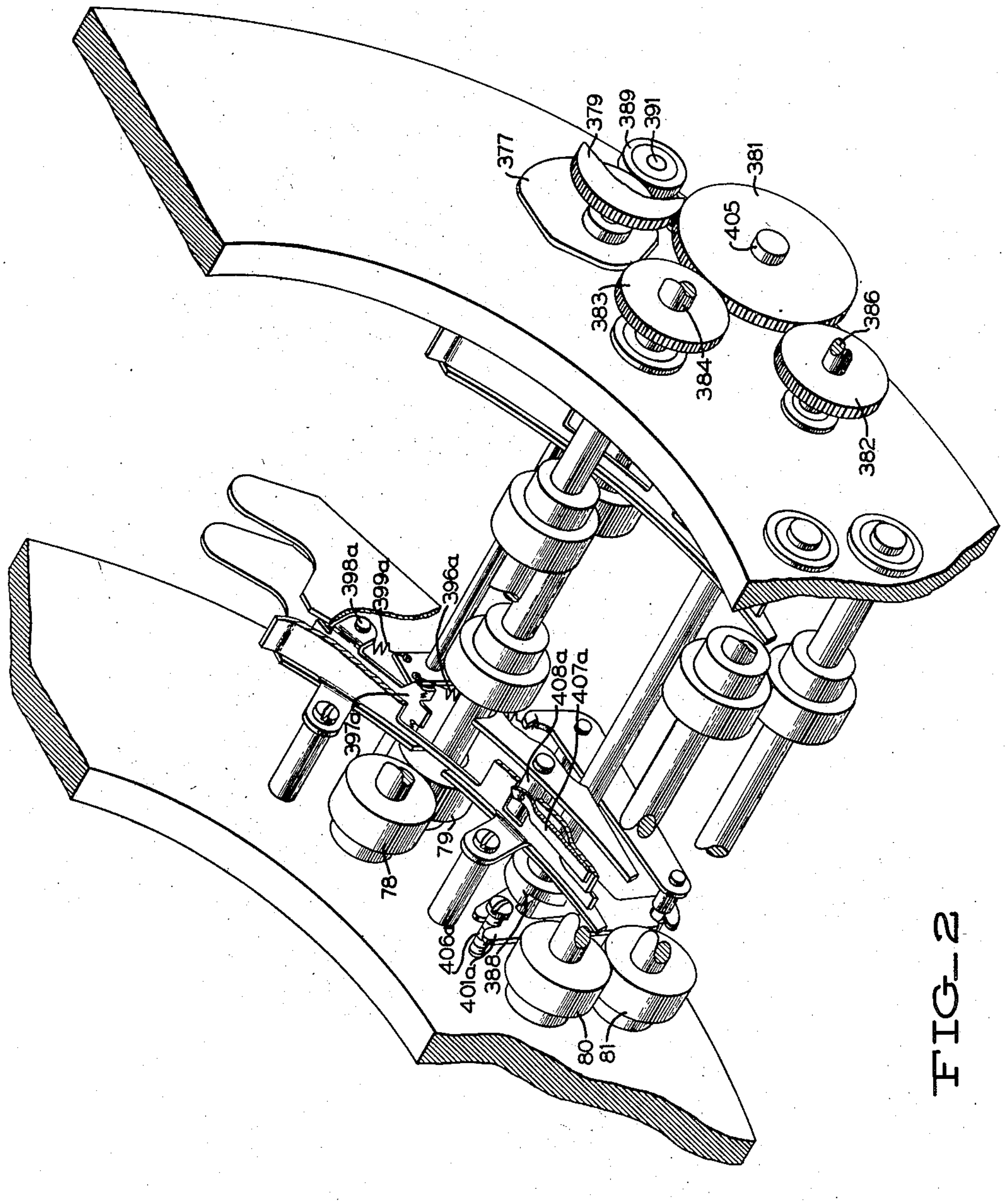
Fig. 2 is an isometric view of the card in-flight aligner mechanism.

Continuously rotating cam 377 (see Figs. 2, 3 and 4) is secured to a shaft 378 which has a gear 379 secured thereto. The gear 379 is driven by a gear 381 which, in turn, drives the gear 382. The gear 381 is driven by a gear 383 connected to a shaft 384 on which feed roller 78 (Fig. 3) is mounted. Another gear (not shown) is attached to shaft 384, and is in mesh with a bull gear (also not shown) which is continuously driven by the main drive motor (not shown) of the machine shown in Fig. 1. Gear 382 (Fig. 2) is mounted on a shaft 386 (see also Fig. 3) on which a pair of so-called barrel-type cams 387 and 388 are mounted. As to be described shortly, these cams and their related mechanism are provided to operate upon the sides of a moving record card at a particular time in a machine cycle.

Referring to Fig. 4, cam follower roller 389 is rotatably mounted on a stud shaft 391 which is fixed to a link 392. This link is secured to another shaft 393 on which a pair of spaced card pusher operating arms 394 (see also Fig. 3) and **394*a* are mounted. Each of the pusher arms is resiliently biased in a counterclockwise direction about shaft 393 by its respective spring 396 and 396*a* which also act to maintain the cam follower roller 389 in operating contact with the surface of constantly rotating cam 377**.

Each card pusher 397 and **397*a* is freely mounted on a respective supporting pin 398 and 398*a* which is connected to an associated pusher arm 394 and 394*a*. The pushers 397 and 397*a* are each resiliently biased in a clockwise direction about their respective pins 398 and 398*a* by a pair of springs 399 and 399*a*, respectively. It should be clear from Fig. 3 that the pusher 397*a* which is similar to the pusher 397**, is provided so that an advancing secondary card can be operated upon at two spaced points of its trailing edge.

Still referring to Figs. 3 and 4, a pair of card side aligners 401 and **401*a* (see also Fig. 2) are each arranged to follow the camming surface of their respective barrel cams 387 and 388. Each of these side aligners is pivotally fixed at its lower end to the rods 403 and 404 by positioning the said aligners in undercut slots in these rods. Furthermore, each card side aligner is biased in a direction toward the camming surface of its respective barrel cam 387 or 388 by a suitable spring, such as the spring 402 which is associated with the side aligner 401, for example. This arrangement will now be described in greater detail with reference to Fig. 4. As stated previously, the side aligner 401 is positioned for pivotal movement within an undercut groove in each of the rods 403 and 404. Furthermore, the spring 402 urges its related aligner 401 along the guiding rod 406 to engage the surface of and thereby follow its barrel cam 387. Thus, the upper end of side aligner 401 will be oscillated in a direction substantially normal to the view shown in Fig. 4 as the barrel cam 387 is caused to rotate, as, it will be recalled, it does so long as the secondary feed unit operates. This is also the case with side aligner 401*a*** (Fig. 3), so that the two side aligners are moved toward and away from one another simultaneously and in timed motion.

A pair of friction springs 407 and **407*a* (see Figs. 2, 3 and 4) which normally ride on idler rollers 408 and 408*a*, respectively, positioned below the secondary card feed line, is provided to prevent a secondary card from being advanced into the bite of feed rollers 80—81 by the shear momentum of the moving card as it is fed out of the bite provided by feed rollers 78—79. The frictional restraint provided by springs 407—407*a* and rollers 408—408*a* to a secondary card can be overcome, of course, by the card feeding and advancing action of card pushers 397 and 397*a*** on the trailing edge of each secondary card.

As a secondary card is advanced by and moved past feed rollers 76—77 (Fig. 4), the leading edge thereof will encounter the upper surface of each of the card pushers 397 and **397*a* (see also Fig. 2), and will cause these spring-biased pushers to be moved in a counterclockwise direction about their respective supporting pins 398 and 398*a*. Immediately thereafter, the leading edge of such a secondary card will be acted upon by feed rollers 78—79, whereupon the advancing secondary card will be moved to a position between the springs 407—407*a* and their respective idler rollers 408—408*a*. As the trailing edge of the secondary card moves beyond the end of each of the pushers 397 and 397*a*, these pushers are released and caused to move in a clockwise direction about their respective pins 398—398*a* under the urging of springs 399 and 399*a*, respectively. The mechanical timing provided for proper operation of the machine (see also Fig. 5) is such that the pushers will immediately after the preceding action takes place, begin to follow the still advancing secondary card which at this time is being advanced by the feed rollers 78—79. However, as soon as the secondary card has been moved beyond these latter-mentioned feed rollers, i.e., out of the bite provided by the same, the pushers 397 and 397*a* will continue to advance the secondary card by engaging the trailing edge of the card. The counterclockwise motion of pusher arms 394 and 394*a* will then advance the card into the bite provided by feed rollers 80—81. At the same time that the card is being so advanced, the card side aligners 401 and 401*a* will be caused to move inwardly in order to engage the opposite sides of the moving secondary card. Thus, any misalignment of the secondary card will at this time be corrected by the operation of the pushers 397 and 397*a* upon the trailing edge of the card along with that of the aligners 401 and 401*a* upon the sides thereof. Accordingly, when the leading edge of the secondary card is advanced into the bite provided by feed rollers 80—81, the said card will be in perfect register and alignment. When this secondary card is fed into the bite provided by these latter-mentioned feed rollers, the card pushers and their related pusher arms are caused to be moved away from the direction of normal secondary card feeding. This, as is clearly shown in Fig. 4, is provided by the action of cam 377 upon the cam roller 389. In addition to the foregoing, during the time that the card pushers are moved back to a starting or home point, the card side aligners 401 and 401*a* are each moved outwardly, i.e., away from their positions whereat they engage the sides of a secondary card. It should be pointed out here that the timed operation of the card pushers and card side aligners, is depicted in the timing diagram of Fig. 5. Referring thereto with particular reference to the in-flight card pusher chart, the pushers 397—397*a* (see also Fig. 6) are caused to start their movement in the direction of card feed at time A, i.e., 330°. At this time the pushers are behind the trailing edge of card 51, but are caused to move at a faster rate than are the pushers. Accordingly, at about 8° depicted by time B in Fig. 5, when the card is released by the feed rollers 78—79 (Fig. 4), the card pushers 397—397*a* (Fig. 6) engage the card trailing edge. It is also at this time that the speed of moving said pushers is decreased to equal the normal rate of feeding cards through the secondary feed. Shortly thereafter at approximately 14°, the in-flight side aligners 401—401*a* are brought into engagement with the sides of the card. At approximately 60°, i.e., time C (Fig. 5), the forward movement of the pushers 397—397*a* (see also Fig. 6) is halted until approximately 111.5°, i.e., time D, when the said pushers are started on their reverse journey to a home position depicted by position E. In between the times B and C, the leading edge of the card has been moved into the bite provided by the next set of feed rollers 80—81 (Fig. 4), and the side aligners 401—401*a*** (Fig. 6) have been moved out of engagement with the sides of the card.

*Summary*

The in-flight card alignment correction provided by the subject in-flight card aligner mechanism, is depicted in somewhat exaggerated form in Fig. 6. As is shown therein, a secondary card 51 in position "A" is being advanced to the left by feed rollers 78—79 (see also Fig. 4) while it is in a considerably misaligned state. When the said card has been moved to position "B" beyond the bite provided by feed rollers 78—79, the card pushers 397 and **397*a* are located behind the trailing edge of the secondary card, while the side aligners 401 and 401*a* are still away from the card. However, after the secondary card has been released from the bite of feed rollers 78—79, and at just about the instant that the card is acted upon by springs 407—407*a* and rollers 408—408*a* so as to prevent the card from being ejected into the bite provided by feed rollers 80—81, the aforesaid card pushers are moved in the direction of card movement. As a result, they engage the trailing edge of the secondary card while the side aligners are moved toward their respective card edges. The action of the card pushers and side aligners is such that the secondary card is completely realigned and registered, as is shown in position "C" of Fig. 6 just prior to the record card being advanced into the bite provided by feed rollers 80—81**.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for aligning a moving record card having front and rear edges comprising sequential feed rolls spaced apart a distance greater than the distance between the front and ear edges of the record card, a record card brake positioned in the line of card movement between said feed rolls to restrain the movement of the record card therebetween, and a card pusher to contact the rear edge of the record card during the interval of restrained movement to align the same.

2. The apparatus of claim 1 wherein said card brake comprises a spring and an idler roller which said spring is adapted to contact, said spring and roller being located on opposite sides of the path of card movement.

3. The apparatus of claim 1 further comprising a pair of oscillatable spring-biased card aligner members for loosely engaging the sides of a card being advanced by said card pushers.

4. The apparatus of claim 1 where said card pusher comprises a pivotably mounted card engager normally intersecting the line of card movement but movable therefrom by the force of the leading edge of a card against said engager, means mounting said card engager for movement in the direction of card movement, and motive means for moving said mounting means at controlled velocities and accelerations to contact the rear edge of said card and move the card in accordance with the movement of said mounting means.

5. Apparatus for aligning a moving record card having front and rear edges comprising sequential feed rolls spaced apart a distance greater than the distance between the front and rear edges of the record card, a record card brake positioned between said feed rolls to restain the movement of the record card therebetween, said card brake comprising a spring and an idler roller which said spring is adapted to contact positioned on opposite sides of the line of card movement and a card pusher to contact the rear edge of the record card during the interval of restrained movement to align said card, said card pusher comprising a pivotably mounted card engager normally intersecting the line of card movement but movable therefrom by the force of the leading edge of a card against said engager, means mounting said card engager for movement in the direction of card movement, and motive means for moving said mounting means at controlled velocities and accelerations to contact the rear edge of said card and move the card in accordance with the movement of said mounting means.

References Cited in the file of this patent

UNITED STATES PATENTS

| | | |
|---|---|---|
| 2,357,809 | Carlson | Sept. 12, 1944 |
| 2,451,752 | Lake et al. | Oct. 19, 1948 |
| 2,741,960 | Oldenboom | Apr. 17, 1956 |
| 2,757,928 | Thomas | Aug. 7, 1956 |